United States Patent [19]

Guilleux

[11] Patent Number: 5,540,257

[45] Date of Patent: Jul. 30, 1996

[54] DEVICE FOR REGULATING THE FLOW OF A FLUID

[75] Inventor: Eugène Guilleux, Villebon sur Yvette, France

[73] Assignee: GEC Alsthom Stein Industrie, Velizy-Villacoublay, France

[21] Appl. No.: 327,642

[22] Filed: Oct. 24, 1994

[30] Foreign Application Priority Data

Oct. 25, 1993 [FR] France ................................. 93 12679

[51] Int. Cl.⁶ ................................................. B65G 53/40
[52] U.S. Cl. ........................ 137/576; 137/209; 137/574; 406/136
[58] Field of Search ................................. 137/209, 574, 137/576; 406/136

[56] References Cited

U.S. PATENT DOCUMENTS

| | | | |
|---|---|---|---|
| 3,035,888 | 5/1962 | Massey | 137/209 X |
| 3,424,186 | 1/1969 | Sparks | 137/576 X |
| 5,282,487 | 2/1994 | Timpany | 137/209 X |

FOREIGN PATENT DOCUMENTS 86138197  11/1986  Germany.

1124260   11/1984  U.S.S.R. ................................. 137/209

OTHER PUBLICATIONS

*Database WPI*, Week 8306, Derwent Publications Ltd., London, GB; ANA 83–12534K & DE–A–32 11 045 (Brennstoffinst) 3 Feb. 1983.

*Database WPI*, Week 9134, Derwent Publications, Ltd., London, GB; AN 91–252022 & US–A– 037 617 (Stone & Webster Eng Corp).

French Search Report FR 9312679.

*Primary Examiner*—Gerald A. Michalsky
*Attorney, Agent, or Firm*—Sughrue, Mion, Zinn, Macpeak & Seas

[57] ABSTRACT

The present invention relates to a device for regulating the flow of a fluid, the device comprising an inlet receptacle and an outlet receptacle that releases the fluid at a regulated flow rate via an outlet opening, the two receptacles being separated by a common wall. The common wall extends from the bottom walls of the receptacles, and a "bell" contrivance is disposed over the common wall to form on either side of the common wall first and second intermediate receptacles in which a gas pressure is kept constant.

7 Claims, 2 Drawing Sheets

DEVICE FOR REGULATING THE FLOW OF A FLUID

FIELD OF THE INVENTION

The present invention relates to a device for regulating the flow of a fluid, and in particular to an outlet valve for fluidized solids coming from a fluidized bed boiler.

More particularly, it relates to a device for regulating the flow rate of a fluid, the device comprising an inlet receptacle for the fluid, which receptacle comprises a bottom wall and receives the fluid that is delivered at an arbitrary rate, the receptacle containing the fluid up to a fill-up level, the device further including an outlet receptacle which has a bottom wall and which releases fluid at a regulated flow rate via an outlet opening, the two receptacles being separated from each other by a common wall that includes a top edge.

BACKGROUND OF THE INVENTION

Servo-controlled mechanical valves are used in general at the common wall for the purpose of regulating the flow. Unfortunately, when operating conditions are relatively unfavorable for such valves, e.g. when they are being subjected to conditions of high temperature or to temperature that is varying very Greatly, then deterioration quickly arises that Gives rise to phenomena of wear and of jamming.

OBJECT AND SUMMARY OF THE INVENTION

The present invention provides a flow rate regulator device that is particularly simple and that withstands operating conditions particularly well.

To do this, according to the invention, the common wall extends from the bottom walls of the receptacles to a height that is lower than the fill-up level of the inlet receptacle, and a "bell" contrivance is disposed over the common wall to form first and second intermediate receptacles on either side of the common wall, the first intermediate receptacle communicating with the inlet receptacle via a first passage extending along the bottom thereof, the second intermediate receptacle communicating with the outlet receptacle via a second passage extending along the bottom thereof, the two intermediate receptacles communicating with each other via a third passage extending over the common wall where a gas pressure is maintained, the two intermediate receptacles being closed (apart from said three passages), and being connected to a device for maintaining the gas pressure.

In a preferred embodiment, said bottoms are horizontal, and the intermediate receptacles are symmetrical about the common wall.

Advantageously, the outlet opening has the same height as the top edge of the common wall.

Preferably, the device for maintaining the gas pressure comprises a gas feed device and a gas leakage device, one of said devices being regulated.

In a first variant, the gas feed device is connected to the topmost level of the "bell" contrivance.

In a second variant, the gas feed device is connected to the bottoms on either side of the common wall.

Advantageously, said third passage is constituted by a plurality of orifices.

The preferred application of the above-defined device lies in implementing a valve for regulating the outlet flow of fluidized solids from a fluidized bed boiler.

BRIEF DESCRIPTION OF THE DRAWINGS

The functions and advantages of these various characteristics appear on reading the following description which is illustrated in the accompanying drawings that show a preferred embodiment of the invention.

MORE DETAILED DESCRIPTION

Figure 1:
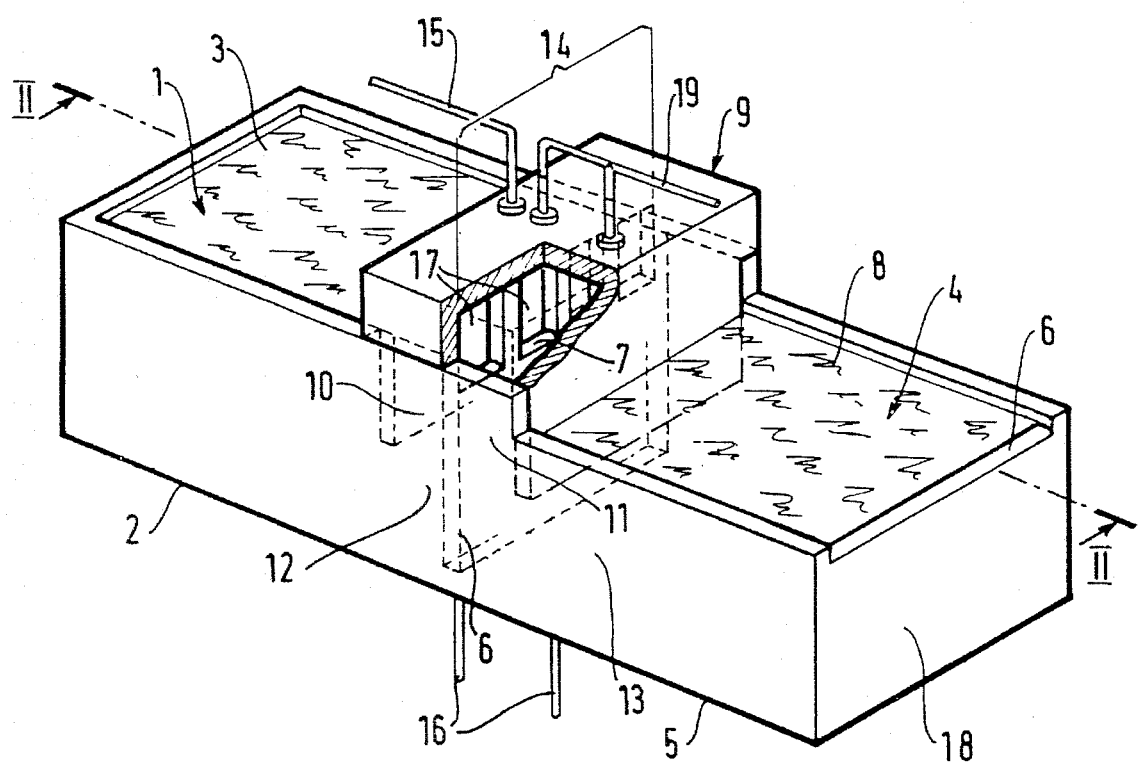
FIG. 1 is a perspective view of a device of the invention.
Figure 2:
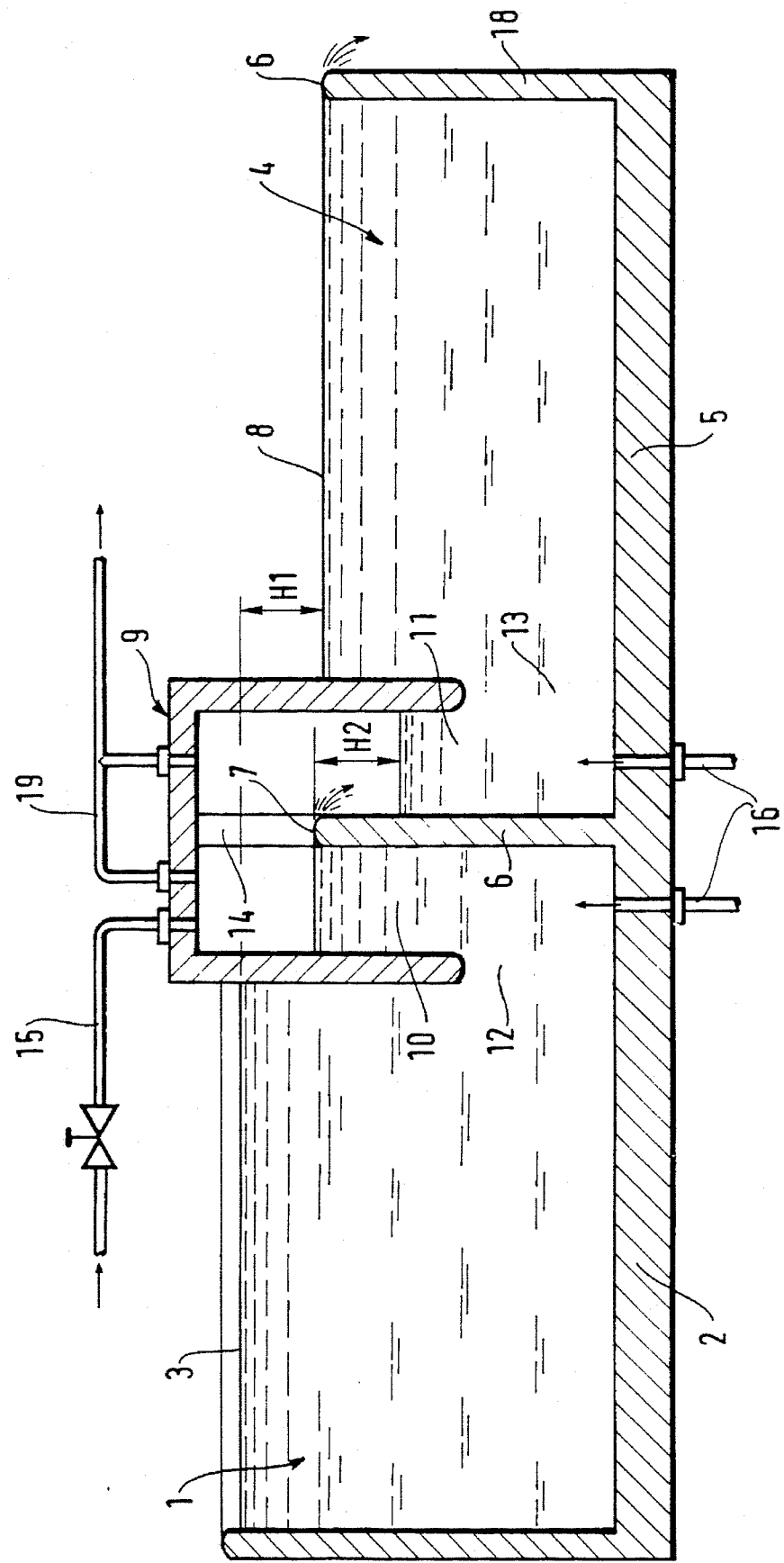
FIG. 2 is a section on II—II through the same device.

The device of the invention for regulating the flow rate of a fluid comprises an inlet receptacle 1 for receiving the fluid and comprising a horizontal bottom wall 2 that receives the fluid which is poured in at an arbitrary rate, and retaining the fluid up to a fill-up level 3, and an outlet receptacle 4 comprising a horizontal bottom wall 5 and releasing fluid at a regulated flow rate via an outlet opening 6 constituted by the top edge of one of the vertical walls, referred to as the discharge wall 18. The bottom walls 2 and 5 may both be at the same level (as shown in the figures), or they may be at different levels.

These two receptacles 1 and 4 are separated by a vertical common wall 6 having a top edge 7 at the same height as the discharge wall 18, and the free surface of the fluid 3, 8 in the two receptacles 1, 4 is subjected, in the preferred embodiment, to a common gas pressure which, in the example shown, is atmospheric pressure since the receptacles 1 and 4 are both open. Under such circumstances, H1=H2. Nevertheless, the device also operates under circumstances in which the free surfaces 3 and 8 in the receptacles 1 and 4 are subjected to different pressures, in which case H1 differs from H2.

The common wall 6 extends from the bottom walls 2 and 5 of the receptacles 1 and 4 up to a height that is lower than the fill-up level 3 of the inlet receptacle 1. A "bell" contrivance 9 is placed over the common wall 6 so as to form first and second intermediate receptacles 10 and 11 disposed symmetrically on either side of said common wall 6. The first intermediate receptacle 10 communicates with the inlet receptacle 1 via a first passage 12 extending along the bottom 2 thereof, while the second intermediate receptacle 11 communicates with the outlet receptacle 4 via a second passage 13 extending along the bottom 5 thereof, and the two intermediate receptacles 10 and 11 communicate with each other via a third passage 14 extending above the common wall 6. Apart from these three passages 12, 13, and 14, the intermediate receptacles 10 and 11 are closed, and a gas pressure P is maintained therein by means of a gas pressure maintaining device 15, 16, and 19.

The device for maintaining the pressure P may be constituted by a gas feed 15 connected to the top of the bell 9. Alternatively, or in addition, it may be constituted by another gas feed 16 connected to said bottoms 2 and 5 on either side of the common wall 6. This second variant is particularly adapted to regulating fluidized solids where the gas also serves as fluidization gas. Furthermore, a gas leak circuit 19 is also connected to the bell 9. The pressure P is thus regulated either by regulating gas feed with constant leakage or by constant feed while regulating leakage.

Advantageously, said third passage 14 is constituted by a plurality of orifices 17 that serve to provide better operating stability. When used with fluidized solids, the weir constituted by such orifices serves to prevent any large agglomerated mass passing suddenly over the edge 7 of the common wall.

It is also possible to regulate the level in the inlet receptacle 1 by means of a weir.

The device operates as follows.

When the fluid arrives in the inlet receptacle 1 at an arbitrary flow rate, a certain quantity of fluid is transmitted to the first intermediate receptacle 10, said quantity being determined by the pressure P as set by regulating the feed rate. The fluid that pours over the common wall 7 thus does so at a constant rate, thereby ensuring that the fluid that pours over the discharge wall 18 also does so at a constant rate.

The device of the invention is particularly designed for use as a valve that regulates the outlet flow of fluidized solids from a fluidized bed boiler. One particular application is treating fluidized solids flowing over the internal wall of the boiler, and recovered in the bottom thereof for recycling in a heat exchanger. The heat exchanger needs to be fed at a constant rate so the valve of the invention is disposed upstream thereof. In general, the valves that are commonly used in this field are damaged very quickly by the thermal conditions under which they operate. It is clear that the regulation device described above is highly insensitive to temperature effects.

I claim:

1. A device for regulating the outflow of fluidized solids from a fluidized bed boiler, the device comprising:

an inlet receptacle for the fluidized solids, wherein said inlet receptacle comprises a bottom wall and receives the fluidized solids that are delivered at an arbitrary rate, said inlet receptacle containing the fluidized solids up to a fill-up level;

an outlet receptacle which has a bottom wall and which releases the fluidized solids at a regulated flow rate via an outlet opening, said inlet and outlet receptacles being separated from each other by a common wall that includes a top edge, wherein said common wall extends from the bottom walls of said inlet and outlet receptacles to a height that is lower than the fill-up level of the inlet receptacle;

a bell disposed over the common wall to form first and second intermediate receptacles on opposite sides of the common wall, respectively, said first intermediate receptacle communicating with said inlet receptacle via a first passage extending along the bottom of said inlet receptacle, said second intermediate receptacle communicating with said outlet receptacle via a second passage extending along the bottom of said outlet receptacle, said first and second intermediate receptacles communicating with each other via a third passage extending over said common wall, said first and second intermediate receptacles being closed apart from said three passages; and a gas feed device for feeding a gas to, and maintaining gas pressure within, said first and second intermediate receptacles, wherein said gas feed device is connected to the bottoms of said inlet and outlet receptacles on opposite sides of said common wall for feeding the gas to said first and second intermediate receptacles to regulate flow of the fluidized solids, and for fluidizing the fluidized solids in said inlet and outlet receptacles.

2. A device according to claim 1, wherein said bottoms are horizontal, and the intermediate receptacles are symmetrical about the common wall.

3. A device according to claim 2, wherein the outlet opening has the same height as the top edge of the common wall.

4. A device according to claim 1, wherein said gas feed device comprises a gas leakage device for allowing the gas to escape from said first and second intermediate receptacles into the atmosphere, thereby lowering the gas pressure within said first and second intermediate receptacles.

5. A device according to claim 4, wherein said gas feed device is also connected to a topmost level of said bell.

6. A device according to claim 1, wherein said third passage comprises a plurality of orifices.

7. A device for regulating the outflow of fluidized solids from a fluidized bed boiler, the device comprising:

an inlet receptacle for the fluidized solids, wherein said inlet receptacle comprises a bottom wall and receives the fluidized solids that are delivered at an arbitrary rate, said inlet receptacle containing the fluidized solids up to a fill-up level;

an outlet receptacle which has a bottom wall and which releases the fluidized solids at a regulated flow rate via an outlet opening, said inlet and outlet receptacles being separated from each other by a common wall that includes a top edge, wherein said common wall extends from the bottom walls of the inlet and outlet receptacles to a height that is lower than the fill-up level of the inlet receptacle;

a bell disposed over the common wall to form first and second intermediate receptacles on opposite sides of the common wall, respectively, said first intermediate receptacle communicating with said inlet receptacle via a first passage extending along the bottom of said inlet receptacle, said second intermediate receptacle communicating with said outlet receptacle via a second passage extending along the bottom of said outlet receptacle, said first and second intermediate receptacles communicating with each other via a third passage extending over said common wall, said first and second intermediate receptacles being closed apart from said three passages; and a gas feed device for feeding a gas to, and maintaining gas pressure within, said first and second intermediate receptacles, wherein said third passage comprises a plurality of orifices for preventing agglomerated masses of a predetermined size from passing suddenly over said common wall between said first intermediate receptacle and said second intermediate receptacle.

* * * * *